(12) United States Patent
Guckert et al.

(10) Patent No.: US 8,211,556 B2
(45) Date of Patent: Jul. 3, 2012

(54) GYPSUM-BASED BUILDING MATERIAL HAVING INCREASED THERMAL CONDUCTIVITY AND SHIELDING ATTENUATION, METHOD FOR PRODUCING THE BUILDING MATERIAL, MOLDING CONTAINING THE BUILDING MATERIAL AND METHOD FOR PRODUCING THE MOLDING

(75) Inventors: Werner Guckert, Baar (DE); Winfried Spickermann, Bodenwerder-Rühle (DE); Heinz-Joachim Butz, Bodenwerder (DE); Stephan Duckwitz, Pegestorf (DE); Dieter Ehlting, Bocholt (DE)

(73) Assignees: SGL Carbon SE, Wiesbaden (DE); Saint-Gobain Rigips GmbH, Duesseldorf (DE)

( * ) Notice: Subject to any disclaimer, the term of this patent is extended or adjusted under 35 U.S.C. 154(b) by 131 days.

(21) Appl. No.: 11/499,294

(22) Filed: Aug. 4, 2006

(65) Prior Publication Data

US 2007/0031704 A1  Feb. 8, 2007

(30) Foreign Application Priority Data

Aug. 4, 2005 (EP) .................. 05 016 944

(51) Int. Cl.
*B32B 19/00* (2006.01)
*B32B 9/00* (2006.01)
*B32B 5/16* (2006.01)

(52) U.S. Cl. .................. 428/701; 428/408; 428/323

(58) Field of Classification Search .................. 428/703, 428/701; 508/105; 106/516; 427/249.6; 423/516; 156/89.13
See application file for complete search history.

(56) References Cited

U.S. PATENT DOCUMENTS

| | | | | |
|---|---|---|---|---|
| 5,194,198 A * | 3/1993 | von Bonin et al. | | 264/42 |
| 5,247,005 A * | 9/1993 | von Bonin et al. | | 524/496 |
| 6,182,407 B1 * | 2/2001 | Turpin et al. | | 52/232 |
| 6,238,594 B1 * | 5/2001 | Turpin et al. | | 252/389.2 |
| 6,746,626 B2 * | 6/2004 | Hayward et al. | | 252/511 |
| 2003/0158314 A1 * | 8/2003 | Abu-Isa et al. | | 524/409 |
| 2005/0051538 A1 * | 3/2005 | Guckert et al. | | 219/544 |
| 2006/0272796 A1 * | 12/2006 | Asmussen et al. | | 165/53 |

FOREIGN PATENT DOCUMENTS

| | | |
|---|---|---|
| DE | 100 49 230 A1 | 4/2002 |
| EP | 1 512 933 A2 | 3/2005 |
| WO | WO 99/62076 | 12/1999 |
| WO | WO 2004/065322 A1 | 1/2004 |

OTHER PUBLICATIONS

Wang et al. Applied Thermal Engineering 30 (2010) 1805-1811.*

* cited by examiner

*Primary Examiner* — David Sample
*Assistant Examiner* — Nicole T Gugliotta
(74) *Attorney, Agent, or Firm* — Laurence A. Greenberg; Werner H. Stemer; Ralph E. Locher

(57) ABSTRACT

A gypsum-based building material having increased thermal conductivity and shielding attenuation, a method for producing the building material, a molding containing the building material and a method for producing the molding are provided. The products and methods include adding ground stock formed of compacted expanded graphite to gypsum-based building materials in order to increase the thermal conductivity and the electromagnetic shielding attenuation of the building materials and moldings, for example gypsum cardboards, produced therefrom.

37 Claims, No Drawings

GYPSUM-BASED BUILDING MATERIAL HAVING INCREASED THERMAL CONDUCTIVITY AND SHIELDING ATTENUATION, METHOD FOR PRODUCING THE BUILDING MATERIAL, MOLDING CONTAINING THE BUILDING MATERIAL AND METHOD FOR PRODUCING THE MOLDING

BACKGROUND OF THE INVENTION

Field of the Invention

The present invention relates to a gypsum-based building material having increased thermal conductivity and shielding attenuation, a method for producing the building material, a molding containing the building material and a method for producing the molding. More specifically, the molding compositions and moldings have increased thermal conductivity and shielding against electromagnetic rays.

It is to be understood in this context that the word molding carries the broad meaning of any object or structural building part produced by molding, rather than the narrow meaning of a decorative recessed or relieved surface or a decorative plane or curved strip used for ornamentation or finishing.

Gypsum boards, specifically gypsum composite boards, gypsum cardboards, gypsum fiberboards and gypsum nonwoven boards, are mainly used as floor, wall and ceiling linings for the interior finishing of buildings. Gypsum is also used in plaster flooring and in gypsum plaster and gypsum fillers.

Gypsum boards and gypsum-based building materials are almost exclusively used in construction engineering for the purpose of thermal insulation, since gypsum has very low thermal conductivity due to its microstructure. According to the prior art, the thermal conductivity of gypsum cardboards is, for example, from approximately 0.18 to 0.22 W/m*K.

However, in addition to the use for the purpose of thermal insulation, there are also other applications in construction engineering for which high thermal conductivity is desirable. Conventional gypsum building materials and gypsum boards are unsuitable for such applications due to their low thermal conductivity.

Furthermore, for many applications, for example for rooms containing EDP (Electronic Data Processing) equipment or for buildings in proximity to mobile communications or other transmitting stations, it is desirable to increase the electromagnetic shielding of the building materials being used. According to the prior art, gypsum cardboards are lined for that purpose with lead foil (see the book entitled: Gips-Datenbuch, Bundesverband der Gipsindustrie [Gypsum-Data Book, Federal Association of the Gypsum Industry] 2003, page 37).

However, it is also known that both objectives may, in principle, be achieved by adding carbon to the building material being used.

For example, International Publication No. WO99/62076 A1 discloses gypsum cardboards having a 30 to 80 μm-thick layer which encases the gypsum core and contains, in addition to cellulose fibers, a dry-mass-based content of preferably from 8 to 15% of carbon fibers having a diameter of from 4 to 10 μm and a length of from 2 to 10 mm. This improves the shielding attenuation against electromagnetic rays.

However, carbon fibers are relatively expensive. In addition, carbon fibers are almost linear structures, i.e. they have a very small surface area. The abutting edges of the boards therefore provide very little contact area for onward conduction of heat or electromagnetic signals: fibers oriented perpendicularly or with an inclination to the butting edge enter into contact only if a fiber end on the edge face of one board precisely abuts a fiber end on the edge face of the following board, and fibers lying on the abutting edge faces of the boards enter into contact only if the fibers meet or intersect one another.

International Publication No. WO 2004/065322 A1 discloses an electrically conductive gypsum-based building material which shields electromagnetic radiation. The electrical conductivity and the shielding effect are achieved by adding a mixture of particles of graphite having a size of less than or equal to 12 μm and amorphous carbon. The content of the mixture of graphite and amorphous carbon is from 25 to 75% of the total mass of the building material. The content of the amorphous carbon is, in turn, from 10 to 95% of the total mass of the mixture of graphite and amorphous carbon. The amorphous carbon contains calcined coke and/or ashes containing amorphous carbon produced by burning an organic component.

The drawbacks of those building materials include the relatively high graphite/carbon content of greater than or at least 25% and the need, in the preparation of the material, to handle substances which have a very fine-grained structure and therefore form a large amount of dust. It is difficult to incorporate fine graphite particles and, in particular, amorphous carbon into an aqueous phase. Due to their relatively low mass at a relatively large surface area and their poor wettability with water, those particles have a marked tendency to float. Although the aforementioned International Patent Application proposed, in the preparation of the material, only mixing the gypsum with the additives, before water is added, there is still the problem, when the gypsum-graphite/carbon mixture is combined with water, of the floating of the carbon and/or the graphite particles and therefore of at least partial segregation of the building material.

German Published, Non-Prosecuted Patent Application DE 100 49 230 A1 proposes the addition of a dry-mass-based content of up to 50%, preferably from 5 to 35%, of graphite to flooring materials such as cement or gypsum, in order to improve the thermal conductivity. The particle size of the graphite should be in the range of from 0.001 to 1 mm, preferably up to 0.5 mm. The use of expandable graphite is particularly recommended, for the following reasons: although expandable graphite has lower thermal conductivity, due to its open-pored foam-like structure, than the solid graphite grain, it combines more intimately with the surrounding binder, as a result of its resilient characteristics and its surface structure. The binder partially penetrates the expandable graphite particle. The resilient characteristics of the expandable graphite compensate for the problem of the different expansion coefficients of the binder and graphite particles and therefore reduce the effect of the thermal contact resistances at the grain boundaries.

The production and characteristics of expandable graphite are described as follows in a technical information document from the firm Graphit Kropfmühl AG: due to the layer lattice structure of graphite, atoms or small molecules may become embedded (intercalated) between the carbon layers. That produces what is known as swelling salt or GIC (Graphite Intercalation Compound). High-grade expandable graphites have a large content of intercalated layers. The embedded molecules are mostly sulfur or nitrogen compounds. Under the effect of heat, the layers are spread apart by thermolysis like an accordion or concertina, and the graphite flakes expand. Depending on the type of expanded graphite, expansion may start at temperatures as low as approximately 150° C. and take place relatively abruptly. In the case of free expansion, the end volume may reach several hundred times the initial volume. The characteristics of the expandable graphite, i.e. starting temperature and swelling capacity, are determined mainly by the intercalation quality (how many of the base-parallel layers were intercalated) and by the intercalation agent.

Within the terminology used in the Graphit Kropfmühl AG publication, the term "expandable graphite" apparently denotes the precursor to the expansion, i.e. the graphite intercalation compound (the graphite salt) which is capable of expansion, and not the expanded state. The use of graphite salts of that type as flame-retarding additives for building materials is known in the art.

However, the reference to the open-pored foam-like structure of the expandable graphite in German Published, Non-Prosecuted Patent Application DE 100 49 230 A1 suggests that it was not the still expandable graphite salt, but rather the already expanded form of the expandable graphite (referred to below as expanded graphite, for the sake of clarity) that was meant in that case. The worm-shaped or accordion or concertina-shaped particles obtained as a result of the thermal expansion are very bulky. The bulk density of expanded graphite, at from 2 to 20 g/l, is very low. The conveyance and metering of particles formed of expanded graphite therefore present considerable technical problems and the incorporation into the aqueous phase is greatly hindered by the floating of the light, bulky particles of expanded material. It would therefore be difficult to achieve homogeneous distribution of expanded graphite in gypsum or cement. A further problem is the marked formation of dust when expanded graphite is used. It is therefore unlikely that heat-conducting additives formed of expanded graphite will, in practice, be found to be suitable for building materials.

Indeed, for the embodiments of the aforementioned patent application, finely ground natural graphite having a particle size of less than 0.05 mm (product supplied by the firm Graphit Kropfmühl AG under the trademark EDM), rather than expanded graphite, was added to the flooring coat. An increase in the thermal conductivity of the flooring coat from 1 to 1.4 W/m*K to from 2 to 2.8 W/m*K was thus achieved.

SUMMARY OF THE INVENTION

It is accordingly an object of the invention to provide a gypsum-based building material having increased thermal conductivity and shielding attenuation, a method for producing the building material, a molding containing the building material and a method for producing the molding, which overcome the hereinafore-mentioned disadvantages of the heretofore-known products and methods of this general type and which provide a thermally conductive and electromagnetically shielding additive for gypsum-based building material molding compositions and moldings produced therefrom.

This additive should bring about a significant increase in thermal conduction and the shielding of electromagnetic radiation, even at relatively low mass fractions. It should also be easy to handle without having to take specific dust extraction measures, etc., and be easy to convey, meter and incorporate, in particular in an aqueous medium. The additive should also affect the characteristics of the gypsum as little as possible and, in particular, should not impair the mechanical stability of the building moldings. It is also desirable that it should be possible to produce the building moldings containing the additive, for example gypsum cardboards, by using substantially the same technology and, apart from the devices required for adding the additive, with the same equipment, as corresponding conventional building moldings.

With the foregoing and other objects in view there is provided, in accordance with the invention, a gypsum-based building material, comprising ground stock formed of compacted expanded graphite being added to the gypsum-based building material. A dry-mass-based proportion of the gypsum building material formed by the ground stock additive is from 5 to 50%, but preferably not more than 25%.

The additive being used in the present invention may be obtained by thermal expansion of a swellable graphite interstitial compound to form expanded graphite and recompression of the expanded graphite to form a two-dimensional structure which is then ground to form particles of the desired size. Plate-like particles having a diameter of from 1 to 5 mm are basically preferred. The bulk density is from 0.12 to 0.25 g/cm$^3$.

The graphite-based additive for gypsum-based building material molding compositions according to the present invention has a number of advantages over the carbon or graphite additives known from the prior art.

The additive particles are relatively compact due to the compression. They therefore tend to form little dust and are easy to handle, convey, meter and incorporate. In particular, they may easily be incorporated in gypsum compositions or the like without the problem of floating in the aqueous medium.

With a particle diameter of from 1 to 5 mm, the particles are relatively large compared to those of additives known from the prior art. This is a particular advantage, since a large additive particle size facilitates the formation of a conductive percolation network in a non-conductive matrix.

It is generally known that in particle composite materials formed of a matrix having low electrical or thermal conductivity and an electrically or thermally conductive additive, the electrical or thermal conductivity is a function of the content of this additive. The conductivity does not increase linearly relative to the content of the conductive additive, but rather rises significantly once the percolation threshold has been reached, i.e. as soon as the conductive additive content is sufficiently high to form a continuous network of conduction paths. Further addition of additive beyond the percolation threshold only results in a minor increase in conductivity.

The capability of forming a network, and therefore the conductive additive content required to reach the percolation threshold, is highly dependent on the additive particle size and size distribution. With additives formed of large particles having a broad size distribution, the formation of a continuous network requires a lower content of additive than with an additive formed of small particles having a narrow size distribution.

However, due to their low bulk density, it is difficult to incorporate additives formed of bulky particles, such as expanded graphite, into a molding composition forming the matrix. At from 0.12 to 0.25 g/cm$^3$, the bulk density of the additive being used in the present invention is in the range between the two limiting cases of expanded graphite (from 0.002 to 0.02 g/cm$^3$), on one hand and natural graphite (from approximately 0.4 to 0.7 g/cm$^3$) and synthetic graphite (from 0.8 to 0.9 g/cm$^3$), on the other hand.

The compression of the expanded graphite eliminates the disadvantageous characteristics of expanded graphite without losing its advantages. In contrast to the bulky expanded graphite particles, particles are obtained which are easy to handle, and which do not float in the aqueous medium and may therefore easily be incorporated in conventional molding compositions. The compression of the expanded graphite also brings about a significant increase in thermal conductivity in the particles.

On the other hand, even compacted expanded graphite still has to a high degree the advantages, known from German Published, Non-Prosecuted Patent Application DE 100 49 230 A1, of uncompressed expanded graphite, i.e. a certain resilience and ease of saturation with a binder. It should be noted in this regard that graphite foil, which is also produced by the compression of expanded graphite and is known, in particular, from sealing technology, is also to a certain extent resilient and may also be impregnated with binders or similar substances, incorporating up to 100% of its own mass.

A further advantage of the ground stock formed of compacted expanded graphite is that its hygroscopicity is similar to that of gypsum. Therefore, the air-conditioning or climatizing effect of the gypsum-based building materials is not reduced by the additive, as would be the case when other additives are used (carbon fibers, synthetic graphite, carbon black and the like).

The graphite particles also have a binding and lubricating effect. The exposure to dust and degree of tool wear in the mechanical machining of moldings such as, for example, gypsum boards are therefore reduced in accordance with the invention. Additives known from the prior art (carbon black, carbon fibers) have no such effect and the dust produced during machining of moldings containing those substances is harmful due to the content of carbon fibers or very fine carbon particles, so that special protective measures would have to be taken during machining.

With the objects of the invention in view, there is also provided a method for producing gypsum-based building materials. The first two steps of the process for producing the additive are known from the production of graphite foil. An intercalation compound is produced from natural graphite. The compound is thermally expanded. The expanded material particles are then compressed to form a two-dimensional structure having a thickness of between 0.1 and 3 mm, preferably at most 1 mm, and a density of between 0.8 and 1.8 g/cm$^3$.

The compressed expanded graphite is ground up in a cutting mill, preferably with screens having a mesh width of between 2 and 4 mm. Particles having a diameter of between 1 and 5 mm are mainly obtained.

The content of the ground stock formed of compacted expanded graphite may be replaced, to a limited extent, by ground natural graphite without significantly detracting from the improvement in thermal conductivity which may be achieved. For example, for a mass-based proportion of the building material formed by the additive of 25%, the proportion of the total mass of the building material formed by the ground stock formed of compacted expanded graphite is 5% and the proportion of the ground natural graphite is 20%. In other words, in this case, 80% of the ground stock formed of compacted expanded graphite is replaced by ground natural graphite. This is economically advantageous, since ground natural graphite is less expensive, because it does not require the expansion and compacting process. A person skilled in the art will select the contents of ground stock formed of compacted expanded graphite and ground natural graphite depending on the individual application, while taking the desired product characteristics (required thermal conductivity, etc.) and the availability of the materials into account.

In addition, the combination of ground stock formed of compacted expanded graphite with other thermally conductive additives, such as natural graphite, is also advantageous because it increases the width of the particle size distribution of the additive. This, in turn, facilitates the formation of a percolation network, since the extended particles obtained by the grinding-up of compacted expanded graphite are able to form conduction bridges between the smaller particles formed of natural graphite.

Other additives which may be added to the ground stock formed of compacted expanded graphite in order to increase the thermal and electrical conductivity of gypsum-based building materials include carbon and metal fibers.

In accordance with the invention, the ground stock formed of compressed expanded graphite is added to gypsum-based building materials. The ground stock is incorporated into the building material in an amount such that it forms a proportion of from 5 to 50% of the dry mass of the building material. The term "gypsum-based building materials" refers, in the present context, to mixtures of gypsum and the conventional additives. These are either used as molding compositions such as gypsum fillers, gypsum plasters, gypsum flooring coat or the like or serve, optionally in combination with other components, as a starting material for the production of moldings such as, for example, gypsum boards, specifically gypsum cardboards, gypsum fiberboards, gypsum non-woven boards and gypsum composite boards. The moldings in accordance with the invention therefore contain a gypsum-based building material to which ground compacted expanded graphite is added in a proportion of from 5 to 50% of the dry mass of the gypsum-based building material.

The invention also relates to composite building components formed of at least one molding containing a gypsum-based building material, to which is added ground stock formed of compacted expanded graphite in a proportion of from 5 to 50% of the dry mass of the building material, and at least one molding containing no gypsum-based building material. This molding containing no gypsum-based building material may, for example, be a hardboard, a board made from a heat insulating material, a tile, a fireclay brick or an aerated concrete brick or the like.

Gypsum boards in accordance with the invention can, for example, be used for the protective sheathing of cable ducts in buildings.

The moldings in accordance with the invention, for example gypsum cardboards, are distinguished not only by significantly higher thermal conductivity, but also by highly uniform heating and heat distribution within the boards or moldings. This effect could be demonstrated by using thermographic tests. The uniform heating of the surface of the gypsum cardboards in accordance with the invention causes effective heat distribution over the entire board, for example in the case of solar irradiation restricted to a partial surface of the board.

Upon simultaneous use of a gypsum filler or gypsum plaster in accordance with the invention, the entire wall surface of a place of residence is thus, for example, heated more rapidly and uniformly and points at which local temperatures are lower that are caused, for example, by cast shadows or junctions between building components, are reduced. In advantageous cases, this even allows the formation of mold or mildew, caused by locally lower component temperatures, to be reduced or prevented. Furthermore, if two-dimensional heating and cooling members or air-conditioning or cooling elements and components are used, the advantage of the very good thermal conduction and the two-dimensional distribution of heat in the moldings and building materials in accordance with the invention is of considerable use, since the improved transfer of heat in turn allows the pipes through which the heating medium flows to be positioned in a configuration (meander, spiral, lattice or the like) with wider meshes than in a conventional building material, so that fewer pipes are required.

The gypsum boards or other moldings in accordance with the invention are optionally impregnated, entirely or in part, with plastics material, for example resins or thermoplastic polymers, in order to improve their impermeability and resistance to mechanical and other environmental influences.

Alternatively or additionally, one or more surfaces of the gypsum boards or other moldings may be provided, entirely or in part, with coats of paint or other forms of coating or covering which perform specific functions, including improving visual appearance, facilitating handleability, fire protection, acting as a barrier against water vapor, improving outward heat insulation and sound absorption, or reducing sensitivity to shocks. Examples of coatings of this type include coats of paint, plastics material coverings, linings with paper, wood veneer, metal foils or plastics material films, metal sheets, metal strips, fabrics or two-dimensional textile structures.

Coatings containing an adhesive, an adhesion promoter or a binder are also possible. These coatings may be used for producing a composite formation between moldings in accordance with the invention or of moldings in accordance with the invention and other building moldings such as, for example, fireclay bricks, aerated concrete bricks or tiles.

Other features which are considered as characteristic for the invention are set forth in the appended claims.

Although the invention is illustrated and described herein as embodied in a gypsum-based building material having increased thermal conductivity and shielding attenuation, a method for producing the building material, a molding containing the building material and a method for producing the molding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiment examples.

DESCRIPTION OF THE PREFERRED EMBODIMENTS

Referring now in detail to the embodiments of the invention, it is noted that the invention will be described below with reference to gypsum cardboards, by way of example. However, in view of the general suitability of the invention for all types of gypsum-based building materials, this choice is not to be understood as entailing any limitation.

The production of gypsum cardboards is known. Gypsum cardboards are generally produced, on continuously operating belt processing lines, from plaster of Paris and additives for the gypsum core and from high-grade cardboard.

In the production of gypsum cardboards, the cardboard that forms the visible side of the board is initially supplied from below. The cardboard is scored for shaping the edges. Gypsum putty, which is distributed through the use of molding stations, is then supplied. The thermally conductive and electrically shielding additive, the production of which was described above, is added to this gypsum putty. At the same time, the cardboard is supplied from above. The slab of gypsum cardboard, which is still very moist, passes through a setting section, at the end of which individual boards are cut into lengths by using a cutting device. The length and belt speed of the setting section are adapted to the setting behavior of the gypsum core. A turntable feeds the boards to a multi-stage dryer. Once the boards have been dried, they are trimmed at their transverse edges and stacked.

The gypsum cardboards are optionally provided with grooves, joints or recesses. It is thus known, for example, to provide a gypsum layer which is boarded on one side with joints that extend through the gypsum core and up to the cardboard layer. A rollable gypsum cardboard material is thus obtained.

Embodiment Examples

Particle size distribution of the additive:

A mixture of compacted expanded graphite having a thickness of between 0.1 mm and 1 mm was ground in a cutting mill with a screen having a mesh width of 3 mm. The particle size distribution of the ground stock was determined by screen analysis. Table 1 shows the results of the screen analysis. Approximately two-thirds of all particles had a diameter of greater than 1 mm.

TABLE 1

| Particle size distribution of the ground stock | |
|---|---|
| Fraction/mm | Percentage |
| <0.2 | 2 |
| 0.2 to 0.5 | 10 |
| 0.5 to 1.0 | 22 |
| 1.0 to 2.0 | 49 |
| 2.0 to 3.15 | 16 |
| 3.15 to 5.0 | 1 |
| 5.0 to 8.0 | 0 |
| >8.0 | 0 |

Thermal conductivity of the gypsum cardboards in accordance with the invention:

Thermal conductivity perpendicular to the plane of the board for the cardboard-covered board, thermal conductivity of the gypsum core (i.e. without the effect of the cardboard covering) and thermal conductivity parallel to the plane of the board, were determined for gypsum cardboards in accordance with the invention having a variable content of the thermally conductive additive. Conventional gypsum cardboards and gypsum cardboards in which the additive was replaced, entirely or in part, by ground natural graphite, containing mainly particles in a size range of from 180 to 300 μm, were also examined for the purpose of comparison.

A one-plate apparatus was used for measuring the thermal conductivity perpendicular to the plane of the board. This apparatus was formed of an electrically heated square central plate having a length of 20 cm, surrounded by a 6-cm-wide first frame-like guard ring, a thermostated second guard ring and a thermostated cooling plate. The guard rings ensured a one-dimensional vertical heat flow in the region of the measuring surface. The sample was located between the hot side of the apparatus (including the central plate and the first guard ring) and the cooling plate. The central plate and first guard ring were electrically heated to a temperature $T_h$. The cooling plate was cooled to a temperature $T_c$. The thermal resistance $1/\Lambda$ of the sample being examined was calculated from the electrical power $P_{el}$ and the surface area A of the central plate with the temperatures $T_h$ and $T_c$, as follows:

$$\frac{1}{\Lambda} = \frac{A * (T_h - T_c)}{P_{el}}$$

If the thickness of the sample is known, the thermal conductivity of the sample perpendicular to the plane of the plate may be calculated from the experimentally determined thermal resistance:

$$\lambda = \Lambda * d = \frac{P_{el} * d}{A * (T_h - T_c)}$$

The values thus measured invariably include fractions of the cardboard covering which act as a serial resistor.

The thermal conductivity of the core material was determined by using the dynamic hot-wire method. In this method, a hot wire embedded in the sample (platinum wire having a diameter of 100 μm and a length of 6 cm) is used simultaneously as a heating element and as a temperature sensor. During the measurement, the wire was heated by using a constant electrical power source. The development over time of the average temperature of the hot wire, which is dependent on the thermal conductivity of the sample, could be established on the basis of the temperature-dependent wire resistance.

For these measurements, the sample plates were halved and the hot wire was embedded, in each case, between the two halves of the sample plate, from which the cardboard casing had been removed in each case at the surface facing the wire. Table 2 summarizes the test results.

TABLE 2

Thermal conductivity of gypsum cardboards including various additives

| Composition and mass-based content/% of the additive | Thermal conductivity Perpendicular to the plane of the board/ [W/(m * K)] | Gypsum core/ [W/(m * K)] |
|---|---|---|
| 0 | 0.231 ± 0.012 | 0.385 ± 0.019 |
| 5 (compacted expanded graphite) | 0.373 ± 0.0019 | |
| 10 (compacted expanded graphite) | 0.466 ± 0.023 | 1.097 ± 0.055 |
| 15 (compacted expanded graphite) | 0.476 ± 0.024 | |
| 15 (ground natural graphite) | 0.398 | |
| 17 (compacted expanded graphite) | 0.453 ± 0.023 | |
| 20 (compacted expanded graphite) | 0.417 ± 0.021 | 1.090 ± 0.055 |
| 20 (natural graphite) + 5 (compacted expanded graphite) | 0.41 ± 0.03 | |

Even a dry-mass-based content of 10% of ground stock formed of compacted expanded graphite resulted in a doubling of the thermal conductivity perpendicular to the plane of the cardboard-covered board. If only the thermal conductivity of the core is measured, the effect is even more apparent, due to the absence of the cardboard covering acting as a serial resistor: an additive content of 10% caused the thermal conductivity of the core material perpendicular to the plane of the board to almost triple.

Increasing the mass-based additive content further to up to 20% caused no further significant increase in thermal conductivity (within the limits of experimental error). This indicates that the percolation threshold is reached with a mass-based content of as low as from 10 to 15% of ground stock formed of compacted expanded graphite.

If ground natural graphite was added to the gypsum core instead, no such large increase in thermal conductivity could be achieved at a comparable mass-based additive content (15%).

However, a mixture of ground stock formed of compacted expanded graphite and natural graphite resulted in a similar increase in thermal conductivity as in the case of an additive containing only ground stock formed of compacted expanded graphite. This was due to the facilitation of the formation of percolation networks at a broad particle size distribution.

Shielding attenuation of the gypsum cardboards in accordance with the invention:

The shielding attenuation of conventional gypsum cardboards and gypsum cardboards having various contents of ground stock formed of compacted expanded graphite was measured, in accordance with The German Standard DIN EN 50147-1, at frequencies of the magnetic field, plane wave and microwave field types (see Table 3).

The measuring system included a signal generator, transmitting antenna, receiving antenna and spectrum analyzer. The sample was located between the transmitting and receiving antennae.

For each measurement frequency, a shielding attenuation S of the material to be examined (Table 3) is obtained as a differential of two measurements of the path attenuation, i.e. a path attenuation $P_0$ without the attenuating material to be examined and a path attenuation $P_s$ with the sample of the material to be examined incorporated in the measuring apparatus. The distance, the orientation and the polarization of the antennae and the output power of the signal generator were identical in the two measurements.

TABLE 3

Measured values of the shielding attenuation/[dB]

| Mass-based additive content/% | Magnetic field | | | | Plane wave | | | Microwave | |
|---|---|---|---|---|---|---|---|---|---|
| | 10 kHz | 156 kHz | 1 MHz | 10 MHz | 107 MHz | 407 MHz | 997 MHz | 10 GHz | 18 GHz |
| 0 | 0 | 0 | 0 | 0 | 0 | 0 | 0 | 0 | 0 |
| 5 | 0 | 0 | 0 | 0 | 2 | 9 | 8 | 18 | 34 |
| 10 | 0 | 0 | 0 | 0 | 6 | 18 | 15 | 31 | 56 |
| 15 | 0 | 0 | 0 | 0 | 13 | 26 | 23 | 46 | 70 |
| 17 | 0 | 0 | 0 | 0 | 16 | 28 | 24 | 43 | 60 |
| 20 | 0 | 0 | 0 | 0 | 18 | 29 | 27 | 51 | 68 |

Whereas gypsum cardboards without additive did not have a shielding effect in any of the frequency ranges examined, the addition of graphite allowed shielding attenuation to be achieved in the plane wave and microwave frequency ranges. The shielding attenuation increased in tandem with the content of the additive. However, the increase in shielding attenuation was much lower in the case of mass-based additive contents above 15% than in the case of mass-based additive contents of up to 15%. This indicated that a percolation threshold had been exceeded, as had also been observed for the thermal conductivity.

We claim:
1. A gypsum-based building material, comprising:
   particulate compacted fully expanded graphite in a content of from 5 to 50%, based on a dry mass of the building material;
   said particulate compacted fully expanded graphite having a density of between 2 and 20 g/l before compacting; and said compacted fully expanded graphite forming a ground stock having a bulk density of between 0.12 and 0.25 g/cm³.

2. The gypsum-based building material according to claim 1, wherein said content of said particulate compacted expanded graphite is at most 25%, based on the dry mass of the building material.

3. The gypsum-based building material according to claim 1, wherein said compacted expanded graphite forms a ground stock containing plate-shaped particles having a diameter of between 1 and 5 mm.

4. The gypsum-based building material according to claim 1, wherein said compacted expanded graphite forms a ground stock, and ground natural graphite is added to said ground stock.

5. The gypsum-based building material according to claim 1, wherein said compacted expanded graphite forms a ground stock, and metal or carbon fibers are added to said ground stock.

6. A gypsum filler, comprising said gypsum-based building material according to claim 1.

7. A gypsum plaster, comprising said gypsum-based building material according to claim 1.

8. A gypsum flooring coat, comprising said gypsum-based building material according to claim 1.

9. A method for producing gypsum-based building materials, the method comprising the following steps:
producing a graphite intercalation compound;
thermally expanding the intercalation compound to form fully expanded graphite;
compressing the fully expanded graphite to form a two-dimensional structure having a thickness of between 0.1 and 3 mm and a density of between 0.8 and 1.8 g/cm³;
the compressed fully expanded graphite having a density of between 2 and 20 g/l before compressing;
grinding the compressed expanded graphite to form a ground stock; and
incorporating the ground stock into a gypsum-based building material in an amount providing a dry-mass-based content of the ground stock of from 5 to 50%.

10. The method according to claim 9, wherein the two-dimensional structure of the compressed expanded graphite has a thickness of at most 1 mm.

11. The method according to claim 9, wherein the ground stock is incorporated into the gypsum-based building material in an amount providing a dry-mass-based content of the ground stock of at most 25%.

12. A molding, comprising:
a gypsum-based building material containing a content of particulate compacted fully expanded graphite of from 5 to 50%, based on a dry mass of said building material;
said particulate compacted fully expanded graphite having a density of between 2 and 20 g/l before compacting; and
said compacted fully expanded graphite forming a ground stock having a bulk density of between 0.12 and 0.25 g/cm³.

13. The molding according to claim 12, wherein said content of said particulate compacted expanded graphite in said gypsum-based building material is at most 25%, based on said dry mass of said building material.

14. The molding according to claim 12, wherein said compacted expanded graphite forms a ground stock containing plate-shaped particles having a diameter of between 1 and 5 mm.

15. The molding according to claim 12, wherein said compacted expanded graphite forms a ground stock, and ground natural graphite is added to said ground stock.

16. The molding according to claim 12, wherein said compacted expanded graphite forms a ground stock, and metal or carbon fibers are added to said ground stock.

17. A gypsum board, comprising the molding according to claim 12.

18. A gypsum composite board, comprising the molding according to claim 12.

19. A gypsum cardboard, comprising the molding according to claim 12.

20. A gypsum fiberboard, comprising the molding according to claim 12.

21. A gypsum non-woven board, comprising the molding according to claim 12.

22. A composite component, comprising:
at least one molding containing a gypsum-based building material according to claim 12; and
at least one molding not containing a gypsum-based building material.

23. The molding according to claim 12, which further comprises an impregnation.

24. The molding according to claim 12, which further comprises:
molding surfaces; and
a coat of paint or other form of coating or covering partly or entirely disposed on at least one of said molding surfaces.

25. The molding according to claim 12, which further comprises:
molding surfaces; and
a material selected from the group consisting of paper, wood veneer, metal foils or plastics material films, metal sheets, metal strips, fabrics and other two-dimensional textile structures, partly or entirely lining at least one of said molding surfaces.

26. The molding according to claim 12, which further comprises:
molding surfaces; and
an adhesive, an adhesion promoter or a binder partly or entirely coating at least one of said molding surfaces.

27. The molding according to claim 12, which further comprises pipes embedded in the molding.

28. A cable duct sheathing, comprising the molding according to claim 12.

29. A system for floor, ceiling or wall heating, comprising the molding according to claim 12.

30. An air-handling ceiling, comprising the molding according to claim 12.

31. A method for producing moldings formed of gypsum-based building materials, the method comprising the following steps:
producing a graphite intercalation compound;
thermally expanding the intercalation compound to form fully expanded graphite;
compressing the fully expanded graphite to form a two-dimensional structure having a thickness of between 0.1 and 3 mm and a density of between 0.8 and 1.8 g/cm³;
the compressed fully expanded graphite having a density of between 2 and 20 g/l before compressing;
grinding the compressed expanded graphite to form a ground stock; incorporating the ground stock into a gypsum-based building material in an amount providing a dry-mass-based content of the ground stock of from 5 to 50%; and
producing moldings from the gypsum-based building material, containing a dry-mass-based content of from 5 to 50% of the ground stock formed of compressed expanded graphite.

32. The method according to claim 31, which further comprises producing further components from the gypsum-based building material, containing a dry-mass-based content of from 5 to 50% of the ground stock formed of compressed expanded graphite.

33. The method according to claim 31, wherein the two-dimensional structure of the compressed expanded graphite has a thickness of at most 1 mm.

34. The method according to claim 31, wherein the ground stock is incorporated into the gypsum-based building material in an amount providing a dry-mass-based content of the ground stock of at most 25%.

35. A building material, comprising:
a gypsum-based material containing particulate compacted fully expanded graphite in a content of from 5 to 50%, based on a dry mass of the building material;
said particulate compacted fully expanded graphite having a density of between 2 and 20 g/l before compacting; and
said compacted fully expanded graphite forming a ground stock having a bulk density of between 0.12 and 0.25 g/cm$^3$.

36. A building material, comprising:
a gypsum-based matrix and particulate compacted fully expanded graphite as an additive in a content of from 5 to 50%, based dry mass of the building material;
said particulate compacted fully expanded graphite having a density of between 2 and 20 g/l before compacting; and
said compacted fully expanded graphite forming a ground stock having a bulk density of between 0.12 and 0.25 g/cm$^3$.

37. A gypsum-based building material, comprising:
particulate compacted fully expanded graphite in a content of from 5 to 15%, based on a dry mass of the building material
said particulate compacted fully expanded graphite having a density of between 2 and 20 g/l before compacting.

* * * * *